July 8, 1958  F. B. BURT  2,841,933

METHOD OF CHAMFERING A VALVE SPOOL

Filed Sept. 27, 1956

INVENTOR.
FARLOW B. BURT
BY
William N. Antonia
ATTORNEY

United States Patent Office 2,841,933
Patented July 8, 1958

2,841,933
METHOD OF CHAMFERING A VALVE SPOOL

Farlow B. Burt, South Bend, Ind., assignor to Bendix Aviation Corporation, South Bend, Ind., a corporation of Delaware Application September 27, 1956, Serial No. 612,548

5 Claims. (Cl. 51—281)

This invention relates to valves and more specifically to a method for chamfering a valve spool.

Various methods of improving valve stability and opposing chatter and oscillations in spool valves have been devised in the past. In some instances some of the lands of the spool have been notched, while in others the lands have been chamfered or deformed in order to achieve the desired metering effect. Oftentimes, the method of achieving the desired metering effect has been costly. It is therefore an object of this invention to provide a method of chamfering a valve spool in a simple, timesaving, and inexpensive manner.

Another object of this invention is to provide a novel method of simultaneously grinding a chamfer on both sides of a valve spool land.

A further object of this invention is to provide a method of grinding chamfers on valve spool lands which will produce a valve spool design having excellent metering characteristics.

The above and other objects and features of the invention will become apparent from the following description of the method taken in connection with the accompanying drawings which form a part of this specification and in which.

Figure 1:
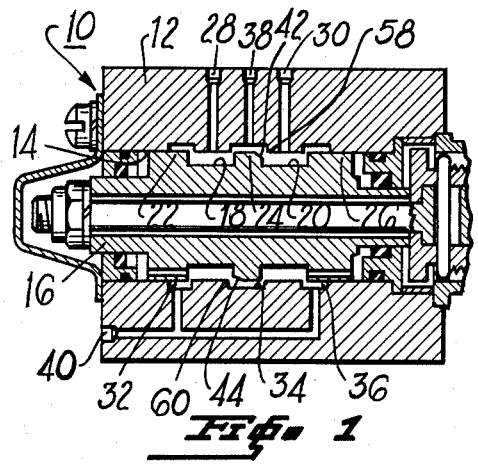
Figure 1 is a sectional view of a control valve incorporating a valve spool chamfered in accordance with the invention.

Referring to Figure 1 of the drawings, numeral 10 designates a control valve for a power steering system comprising a housing member 12 having a bore 14 therein. A valve spool 16 lies within the bore 14 and is movable in opposite directions from a normally neutral or center position, thereby controlling flow in a hydraulic system. The valve spool 16 has two annular channels 18 and 20, formed by lands 22, 24 and 26, said channels communicating with cylinder ports 28 and 30 respectively. The bore 14 of the housing is provided with annular channels 32, 34 and 36. Annular channel 34 communicates with a return port 38 and annular channels 32 and 36 communicate with an inlet port 40. The control valve shown in Figure 1 is an open center type valve which in neutral position allows free flow of the hydraulic fluid between the inlet port 40 and the return port 38 via the annular channels which are arranged in overlapping relationship.

In order to improve valve stability and to prevent extremely rapid applications of power steering, upon initial movement, which might tend to cause undesirable jerks in the steering "feel," chamfers 42 and 44 are ground on the central land 24. As a result of these chamfers, movement of the spool 16 within the valve housing will cause a slow and gradual initial power movement of the piston within the power steering cylinder (not shown). Not only will there be a gradual application of power steering effort, responsive to movement of the valve spool relative to the housing, but there will also be a gradual removal of power steering effort, responsive to movement of the spool. Of course the rate of application of power steering will be governed by the amount and type of deformation to which the land is subjected.

Figure 2:
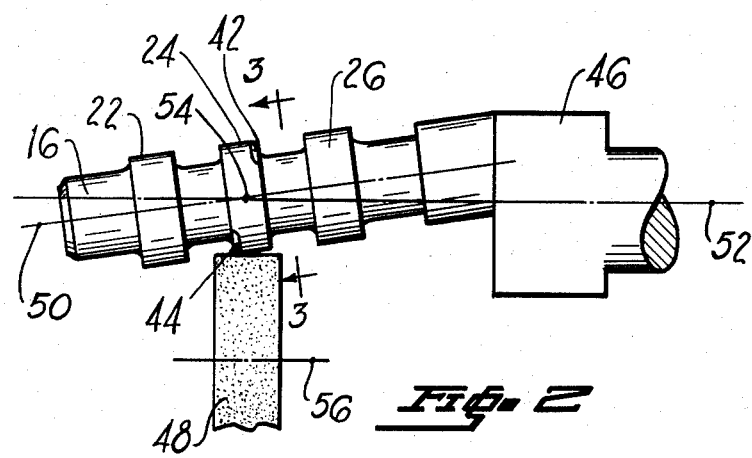
Figure 2 shows the relationship of a valve spool, chamfered in accordance with the invention, with respect to a grinding fixture and grinding wheel.
Figure 3:
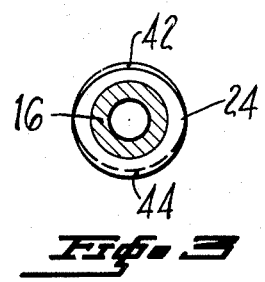
Figure 3 is a sectional view taken on line 3—3 of Figure 2.
Figure 4:
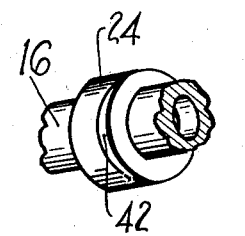
Figure 4 is a perspective view of a portion of the valve spool.

The invention claimed herein concerns a method of easily and economically grinding chamfers on a valve spool to give it excellent metering characteristics. Looking at Figure 2, it will be seen that numeral 46 designates a grinding fixture and numeral 48 designates a grinding wheel. In order to grind the desired chamfers 42 and 44 on the central land 24, the spool 16 is placed in a rotatable grinding fixture so that the axis 50 of the spool intersects the axis of rotation 52 of the fixture 46 at the center 54 of the land 24 which is to be chamfered. Rotation of the fixture about its axis will in effect cause the spool to wobble about the center 54 of land 24. By moving the grinding wheel 48, which has an axis of rotation 56 parallel to the axis of rotation of the fixture, into contact with the center land 24, it is possible to simultaneously chamfer the opposite edges of the land in one operation, thereby chamfering the spool in a simple, timesaving, and inexpensive manner.

A further advantage of this method, is that the resulting chamfers are such that the rate of closure between the chamfered edges 42 and 44 of the land 24 and the edges 58 and 60 of the housing is constant.

The several practical advantages which flow from my method of grinding chamfers on valve spool lands are believed to be obvious from the above, and other advantages may suggest themselves to those who are familiar with the art to which this invention relates.

Having thus described the various features of the invention, what I claim as new and desire to secure by Letters Patent is:

1. A method of chamfering a valve spool land comprising the steps of placing a valve spool in a rotatable grinding fixture so that the axis of the spool intersects the axis of rotation of the fixture at the center of the land to be chamfered, rotating said fixture about its axis, and moving a grinding wheel having an axis of rotation parallel to the axis of rotation of the fixture into contact with the land to simultaneously chamfer the opposite edges of the land.

2. A method of chamfering a valve spool and comprising the steps of placing a valve spool in a rotatable grinding fixture so that the axis of the spool intersects the axis of rotation of the fixture at the center of the land to be chamfered, rotating said fixture about its axis, and moving a grinding wheel into contact with the land to simultaneously chamfer the opposite sides of the land.

3. A method of chamfering a valve spool land comprising the steps of placing a valve spool in a rotatable grinding fixture at an angle to the axis of rotation of said fixture, rotating said fixture about its axis, and moving a grinding wheel having an axis of rotation parallel to the axis of rotation of the fixture into contact with said spool to chamfer said valve spool land.

4. A method of chamfering a valve spool land comprising the steps of placing a valve spool in a rotatable grinding fixture so that the axis of the spool intersects the axis of rotation of the fixture at the center of the land to be chamfered, rotating said fixture about its axis, and moving abrasive means against the land to simultaneously chamfer the opposite edges of the land.

5. A method of chamfering a valve spool land comprising the steps of placing a valve spool in a rotatable grinding fixture so that the axis of the spool intersects the axis of rotation of the fixture at the center of the land to be chamfered, rotating said fixture about its axis, and touching said land against material removing means to simultaneously chamfer the opposite edges of the land.

References Cited in the file of this patent
UNITED STATES PATENTS 2,299,126     Cantley _____ Oct. 20, 1942